Dec. 3, 1935.  J. C. BACKE  2,023,352
VEHICLE WHEEL
Filed Jan. 19, 1935  2 Sheets-Sheet 1

Inventor
John C. Backe
By Clarence A. O'Brien
Attorney

Dec. 3, 1935.   J. C. BACKE   2,023,352
VEHICLE WHEEL
Filed Jan. 19, 1935   2 Sheets-Sheet 2
Fig. 4.
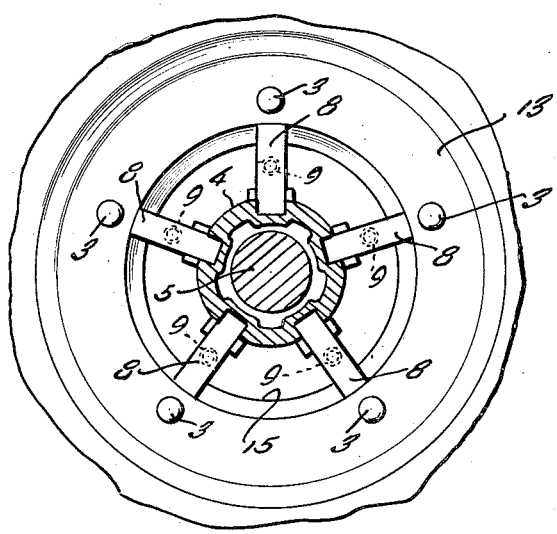
Fig. 5.
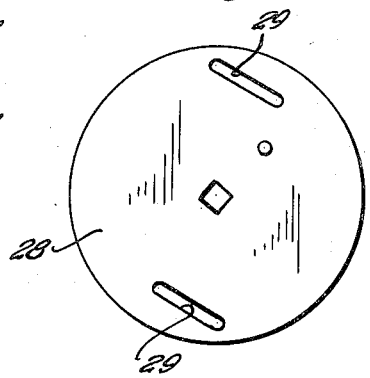
Fig. 3.
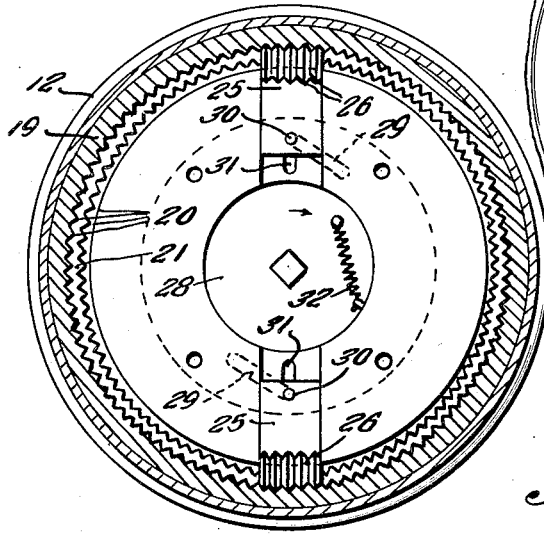
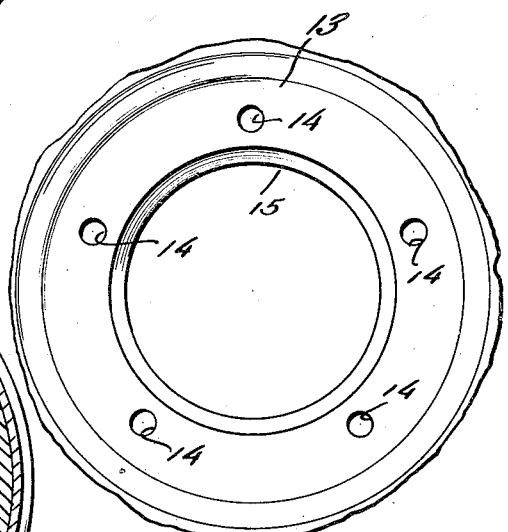
Fig. 6.
Inventor
John C. Backe
By Clarence A. O'Brien
Attorney Patented Dec. 3, 1935

2,023,352

UNITED STATES PATENT OFFICE 2,023,352

VEHICLE WHEEL

John C. Backe, Howell, Mich.

Application January 19, 1935, Serial No. 2,579

1 Claim. (Cl. 301—9)

The present invention relates to new and useful improvements in wheels for vehicles, particularly automobiles, and has for its primary object to provide, in a manner as hereinafter set forth, a novel construction, combination and arrangement of parts through the medium of which the wheel may be firmly secured in position by a single nut.

Another very important object of the invention is to provide, in a vehicle wheel of the aforementioned character, novel means for retaining the securing nut.

Still another important object of the invention is to provide a novel construction and arrangement through the medium of which the wheel may be expeditiously applied or mounted and removed with respect to a spindle or axle shaft with a minimum of effort.

Other objects of the invention are to provide a vehicle wheel of the character described which will be comparatively simple in construction, strong, durable, highly efficient and reliable in use, compact, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a vertical sectional view, taken substantially on the line 3—3 of Figure 1.

Figure 4 is a vertical sectional view, taken substantially on the line 4—4 of Figure 1.

Figure 5 is a detail view in elevation of the rotary disk which actuates the locking bolts.

Figure 6 is an elevational view of the inner plate constituting a part of the wheel hub.

Figure 1:
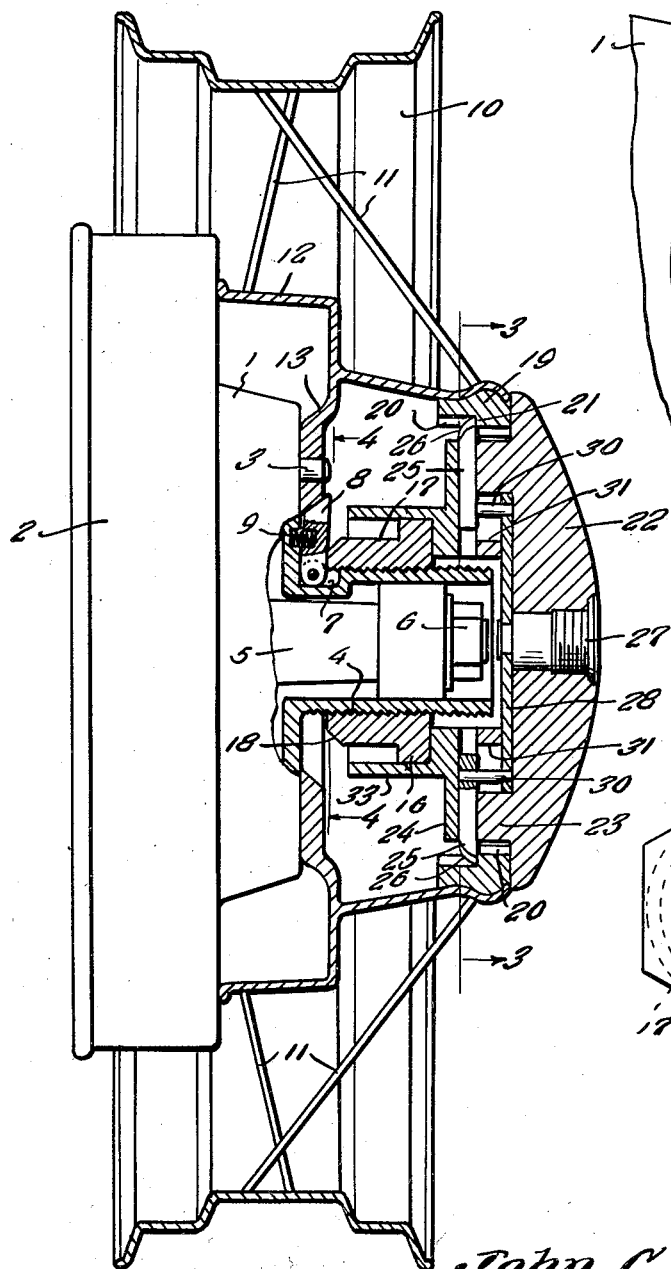
Figure 1 is a view principally in vertical section through a vehicle wheel constructed in accordance with the present invention.

Referring now to the drawings in detail, it will be seen that the embodiment of the invention which has been illustrated comprises an inner hub 1 which, as usual, carries a brake drum 2. Projecting from the outer side of the inner hub 1 is a plurality of lugs or pins 3, the purpose of which will be presently set forth. The hub 1 further includes an externally threaded cylinder 4 with which the pins 3 are concentric. Of course, the inner hub 1 is secured in the usual manner on an axle 5, as by a nut 6. The inner end portion of the cylinder 4 has formed therein a plurality of pockets 7 in which locking dogs 8 are pivotally mounted. Springs 9 yieldingly urge the dogs 8 toward inoperative position.

The reference numeral 10 designates a wheel of the drop center type having wire or steel spokes 11 therein. The wheel 10 comprises a hub 12 which, as illustrated to advantage in Figure 1 of the drawings, includes a plate 13 which is adapted for abutting engagement with the outer face of the inner hub 1, said plate having a plurality of openings 14 therein (see Figure 6) for the reception of the pins 3. The plate 13 is further provided with a centrally located opening 15 which accommodates the cylinder 4, the locking dogs 8, etc. The walls of the opening 15 are beveled for engagement by the correspondingly shaped free ends of the dogs 8. Threadedly mounted on the cylinder 4 is a nut 16 which includes a tubular extension 17, said extension 17 having a beveled free end portion 18 for engagement with the locking dogs 8.

Fixed in the outer portion of the wheel hub 12 is a ring 19 having a stepped, toothed inner periphery 20 providing a shoulder 21. The reference numeral 22 designates a cap which is removably mounted on the outer end of the wheel hub 12. On its inner side, the cap 22 is formed to provide a casing 23 which includes a closure plate 24. Slidably mounted in the walls of the casing 23 are bolts 25 which are engageable with the shoulder 21 to secure the cap 22 in position on the wheel hub 12. The outer ends of the bolts 25 are toothed, as at 26, for engagement with the teeth 20 for preventing rotation of the cap 22. A cylinder lock 27 is mounted centrally in the cap 22 and has fixed thereon a disk 28 which is operable in the casing 23. The disk 28 has formed therein cam slots 29 in which pins 30 which project from the inner end portions of the bolts 25 are engaged. Slots 31 in the casing 23 accommodate the pins 30. A spring 32 (see Figure 3) has one end connected to the inner periphery of the casing 23 and its other end connected to the disk 28 for yieldingly urging said disk in a direction to move the bolts 25 outwardly to locking or operative position. Projecting inwardly from the plate 24 is a polygonal socket member 33 which receives the nut 16 in a manner to positively lock said nut against rotation on the cylinder 4 when the cap 22 is locked in position.

Figure 2:
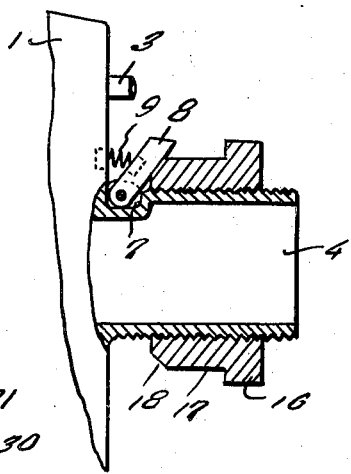
Figure 2 is a view principally in vertical section through what will be hereinafter referred to as the inner hub.
Figure 7:
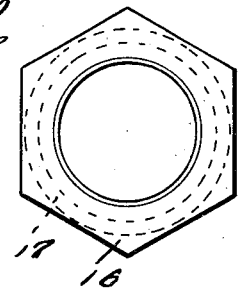
Figure 7 is a detail view in end elevation of the retaining nut.

To mount the wheel on the inner hub 1, the nut 16 is backed off the cylinder 4 sufficiently to permit the springs 9 to swing the dogs 8 outwardly to inoperative position, in which position said dogs rest on the beveled inner end 18 of the tubular sleeve portion 17, as suggested in Figure 2 of the drawings. The hub 12 with the cap 22 removed, of course, is then mounted in position with the pins 3 engaged in the openings 14 of the plate 13, the diameter of the opening 15 in said plate being sufficient to clear the nut 16 and the retracted dogs 8. The nut 16 is then threaded inwardly on the cylinder 4 in a manner to swing the dogs 8 into engagement with the plate 13 for securely clamping said plate against the inner hub 1, the beveled outer or free ends of said dogs engaging the correspondingly shaped walls of the opening 15, as shown to advantage in Figure 1 of the drawings. The socket member 33 is then fitted on the nut 16 and the cap 22, with the locking bolts 25 in retracted position, is mounted on the wheel hub 12. After initial engagement of the socket member over the nut 16 the cap 22 is forced inwardly, the locking bolts 25 riding over the outer teeth 20 of the ring 19 and engaging behind the shoulder 21 in a manner to effectively prevent removal of the cap. The teeth 26 of the locking bolts 25, when said locking bolts are engaged with the shoulder 21, engage the inner teeth 20 of the ring 19 and in this manner positively secure the cap 22 against rotation which, of course, also secures the nut 16 against rotation on the cylinder 4.

When it is desired to remove the wheel, the cap 22 is, of course, removed by retracting the bolts 25 sufficiently to clear the shoulder 21. Removal of the cap 22 gives access to the nut 16 which is backed off by suitable means, such as a wrench, sufficiently to permit the locking dogs 8 to swing to inoperative position. The wheel hub 12 may then be slipped off the pins 3 and passed over the retracted dogs 8 and the nut 16.

It is believed that the many advantages of a vehicle wheel constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A vehicle wheel comprising an inner hub, an outer hub removably mounted on said inner hub, said outer hub including internal teeth and further including an internal shoulder, means including a nut for securing the outer hub in position on the inner hub, a cap removably mounted on the outer hub, a socket member on said cap engageable over the nut for retaining said nut against rotation, and locking bolts mounted on the cap and engageable with the teeth and with the shoulder for securing said cap in position on the outer hub and against rotation on said outer hub.

JOHN C. BACKE.